United States Patent
Claussnitzer (12)
(10) Patent No.: US 6,240,990 B1
(45) Date of Patent: Jun. 5, 2001

(54) APPARATUS FOR APPLYING A LABEL TO A COMPACT DISK OR THE LIKE

(76) Inventor: Werner Claussnitzer, Boeddinghausstrasse 2, D-42329, Wuppertal (DE)

( * ) Notice: Subject to any disclaimer, the term of this patent is extended or adjusted under 35 U.S.C. 154(b) by 0 days.

(21) Appl. No.: 09/194,977

(22) PCT Filed: Jun. 3, 1997

(86) PCT No.: PCT/EP97/02869

§ 371 Date: Apr. 19, 1999

§ 102(e) Date: Apr. 19, 1999

(87) PCT Pub. No.: WO97/46454

PCT Pub. Date: Dec. 11, 1997

(30) Foreign Application Priority Data

Jun. 5, 1996 (DE) .............................. 196 22 559
Jul. 16, 1996 (DE) .............................. 196 28 678

(51) Int. Cl.[7] ........................................ B32B 31/00
(52) U.S. Cl. .................... 156/391; 156/556; 156/580
(58) Field of Search ...................... 156/556, 538, 156/574, 579, 580, DIG. 24

(56) References Cited

U.S. PATENT DOCUMENTS 3,428,509 * 2/1969 Messmer .............................. 156/361
5,316,464  5/1994 Lexell .
5,435,246  7/1995 Edman .
5,543,001 * 8/1996 Casillo et al. ........................... 156/60
5,783,031 * 6/1998 Sievers ................................... 156/556
5,951,819 * 9/1999 Hummell et al. ..................... 156/556
5,958,177  9/1999 Claussnitzer .

FOREIGN PATENT DOCUMENTS

B-52145/96  7/1996 (AU) .
2 009 816   3/1970 (DE) .
347 357     4/1978 (DE) .
2305907     4/1997 (GB) .
5-325495   10/1993 (JP) .
9605057     2/1996 (WO) .

* cited by examiner

Primary Examiner—Richard Crispino
Assistant Examiner—Sue A. Purvis
(74) Attorney, Agent, or Firm—Schiff Hardin & Waite (57) ABSTRACT

The invention relates to a device for centrally applying a perforated label to a compact disc or the like, having a base with a supporting plate with a central drilling for the label, and to provide optimum handling, proposes that a central pin (5) secured to the base pass through the central drilling (26), the supporting surface (9) project and be retractable against the force of a spring (20) perpendicularly to the plane (14) compressed by the outer edge (130 of the supporting surface (9) into a guide (21) integral with the base.

34 Claims, 8 Drawing Sheets

APPARATUS FOR APPLYING A LABEL TO A COMPACT DISK OR THE LIKE

FIELD OF THE INVENTION

The invention relates to an apparatus for centralised application of a label with a hole in it to a compact disk or the like, having a base which has a bearing plate with a central hole for placement of the label.

BACKGROUND OF THE INVENTION

Such an apparatus, which is known from WO 96/05057, has a base in the form of a piece of tube on which an annular bearing plate is placed at the end. This bearing plate has a central hole whose diameter corresponds substantially to the inner region of a compact disk, which is not written to. On the other hand, the hole diameter is larger than the central aperture in the disk. A likewise annular label is aligned on the bearing surface for fitting to a compact disk, in such a manner that this label ends at the outer edge of the bearing surface, and the hole in the compact disk and the hole in the label match as far as possible. The disk is now placed onto a conical centralising stud, for which reason this centralising stud provides an annular shoulder, from which a peg projects, passing through the central aperture in the disk. The arrangement can then be held on this peg. At the other end, the centralising stud is formed to be conical. Its cone tip is inserted into the hole in the bearing plate, and the stud is then intended to centralise itself during lowering.

In the case of this apparatus, accurate alignment of the label (which may be, for example, self-adhesive) on the bearing plate has first of all been found to be a problem. The centralising is also often unsatisfactory since it is very easy for the compact disk to which the label is to be applied to be tilted.

Against this technical background, the object is to optimize an apparatus of an type under discussion in respect of its handling and, furthermore, also to ensure exact positioning even during the labeling process.

SUMMARY OF THE INVENTION

This technical problem is solved by employment of a central pin which is connected to the base passes through the central hole, projects beyond the bearing surface and can be lowered, against the force of a spring, in a guide which is fixed to the base, at right angles to the plane defined by the outer edge of the bearing surface. As a result of such an arrangement, a range of advantages are achieved in use. First of all, an integrated apparatus is provided in which, for example, the centralising pin cannot become displaced or offset in any other way. However, the critical factor is the design of the pin which is connected to the base and projects beyond the bearing surface. This considerably simplifies the positioning on the bearing surface of a label with a hole in it. This is because the pin, which passes through the label hole, allows the label to be applied such that it is centralised very exactly. The compact disk to be labeled is then placed on the pin and is lowered towards the bearing surface. This is possible since the pin can be lowered at right angles to the plane defined by the outer edge of the bearing surface, to a considerable extent under the plane, in a guide which is fixed to the base. In consequence, the compact disk which has been placed on the pin is also lowered at right angles to the bearing surface, and its broad side which is to be labeled comes into contact with that side of the label which is, for example, self-adhesive, when the plane and the bearing surface coincide with one another. However, it is preferred in this case for the bearing surface to be set back with respect to the plane in the direction in which the pin is lowered, from the outer edge towards the central hole. Since such an angling or set-back is only a few degrees, the flexibility of the compact disk means that it can easily match itself to such a basin-shaped formation on the top of the base, during labeling. Thanks to the guidance, the compact disk and/or the pin can move only within the tolerance range. If the diameter of the hole in the label corresponds substantially to that of the pin, the pin is formed, for ease of handling, to taper conically and/or to taper in a stepped manner, projecting beyond the bearing surface. By this reduction in cross section, a likewise advantageous placement of the label is also achieved. Furthermore, such a pin can also easily be passed through the central aperture in the compact disk and the compact disk is thus also centralised. However, it is preferable for the pin to provide an annular shoulder for this purpose towards its free end, on which the compact disk can be placed, and to have a cylindrical shank which passes through the central aperture in the compact disk with an accurate fit. This results on the one hand in the CD being centralised exactly on the pin and, on the other hand, in the plane which is defined by the outer edge of the bearing surface and/or the bearing surface itself with the label placed on it, and its adhesive surface, as well as the flat side of the compact disk which is to be labeled, being exactly parallel. A casing wall which is formed to be concentric with the pin is provided as the guide which is fixed to the base. This is envisaged as being, in particular, a rotationally symmetrical arrangement. The casing wall can be formed by a hole in the base, but, in order to save material, a hollow cylinder is preferably fitted on the underside of the bearing plate, the internal diameter of the hollow cylinder being aligned with the central hole. In this case, it is furthermore possible to provide for the casing wall to be longitudinally grooved in the lowering direction inside the base and underneath the bearing surface, and for guide projections of the pin to be guidingly retained in the grooves. In this way, guidance is provided in which the pin can move only in the axial direction. Twisting is excluded. At the same time, such a guide can be easily produced. It is preferred that the base is provided as one piece, in the form of a tube with a bearing surface, which is closed at the end, and with walls which enclose the central hole under the bearing surface in the manner of circular segments, the walls leaving between them, in the lowering direction, slots for guide projections. Such a base may also be provided, for example, easily as an injection-moulded part, being composed, for example, of an ABS plastics. In the provision of such a guide, it is furthermore preferred for the casing wall and the walls to guidingly surround the pin. By this measure, the already described guide projections come to act as stops. The stop for the guide pins in the not-in-use position, that is to say when the pin projects free of the bearing surface, is provided against the wall of the bearing surface on the inside of the base. If, as is preferred, the casing wall is formed to guide the pin by surrounding it in an annular manner, a stop can be formed by the pin and the cross sectional area bounded by the casing wall having corresponding increases in cross section underneath the bearing plate. Annular shoulders are defined by the increases in cross section which, making contact with one another, determine the projection of the pin beyond the bearing surface. Correspondingly formed stops can likewise be provided to limit the lowering depth of the pin, so that the pin still projects slightly beyond the bearing surface in its maximum lowered position, so that the label is guided by the pin as before but, on the other hand, adhesion of the label is reliably ensured. A stop and, in particular, a connection of the pin to the base which is secure against release are preferably provided, according to the invention, by means of a plate which closes the slots and grooves at the free ends of the casing wall and walls, and/or by seating the free end of the casing wall on the plate. The connection between plate and casing wall and walls can be produced, for example, by a positive lock and/or by gluing. It is preferred for the plate to be releasably connected to the casing wall and/or walls. A releasable connection, such as a latching connection or a clamping seat, has advantages particularly if it is intended to provide a spring between plate and pin. This is also accessible subsequently in such an apparatus. In order to guide the spring, it is also possible to provide for this spring to be held on a peg which engages in the spring and in an axial recess in the pin. There is then no need for any further measures for guiding such a compression spring. In a further embodiment of the invention, a ram is also provided which has a central hollow peg whose internal diameter corresponds to the external diameter of the cylindrical shank of the pin. While being gripped on the hollow peg, this ram can be placed on the CD, which is held on the annular shoulder of the pin by the shank and by the annular shoulder. The compact disk is then pressed down by its ram surface whose diameter should correspond to the diameter of the label. This ram offers two advantages. On the one hand, it allows the CD to be lowered while in exact alignment, without gripping the CD itself. In this way, tilting of the compact disk is virtually excluded. Furthermore, at the moment when the CD is pressed onto the adhesive surface of the label, the ram surface also exerts a uniform pressure, resulting in addition in a uniform adhesion of the label and compact disk. Finally, plate and ram may be physically identical, that is to say, for example, identical injection-moulded parts. These may also be composed of an ABS plastics. In this way, the number of injection moulds is reduced. In particular, if the bearing surface is provided in the form of a trough, it is envisaged that this can resiliently provide the ram collar with the ram surface. This also ensures a uniform contact pressure. In a further preferred embodiment, the invention also proposes in this context that has a projection which protrudes beyond the lower ram surface on the ram, which is associated with an inner region (in projection) of the CD which is not written to. The projection is furthermore preferably provided in the form of a circular ring (annulus). In addition, as a further detail—or else alone, as an alternative to the annular arrangement—it may have ribs which run in a star shape. The ribs and the annular projection have the same height. In this way, the force is concentrated onto an inner region of the CD. The contact between the CD and the ram is minimised. The height of the annular projections and of a rib furthermore preferably corresponds approximately to the thickness of the ram disk. On the other hand, this height also corresponds approximately to twice the thickness of a CD.

Other objects and advantages of the invention will become apparent upon reading the following detailed description and appended claims, and upon reference to the accompanying drawings.

BRIEF DESCRIPTION OF THE DRAWING

The invention will be explained in more detail with reference to the drawing, in which only exemplary embodiments are illustrated. In the drawing.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
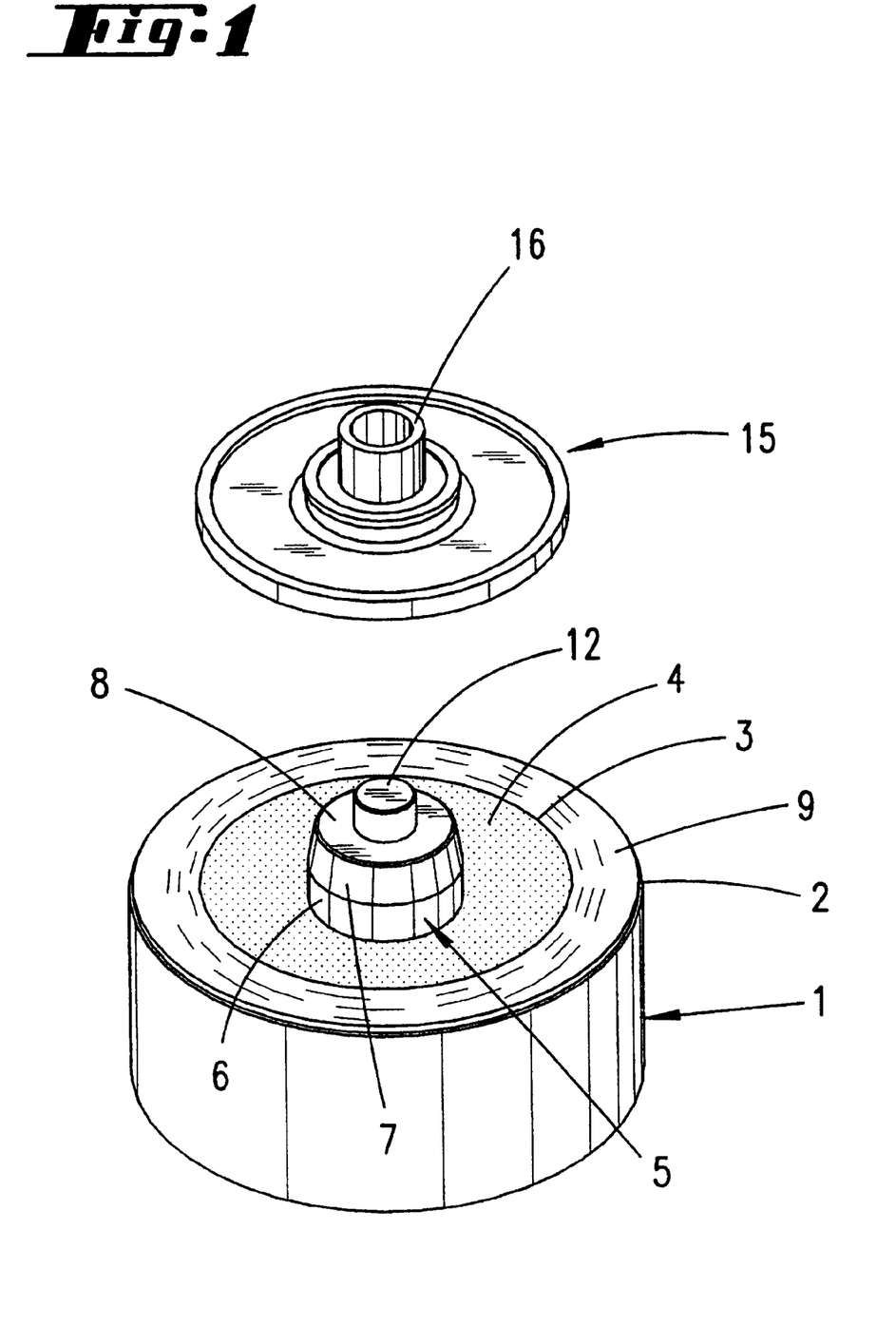
FIG. 1 shows a first exemplary embodiment of an apparatus according to the invention for labeling a compact disk, and a ram.

FIG. 1 shows an isometric illustration of the apparatus according to the invention. The apparatus comprises a cylindrical base 1 with a bearing plate 2 for a label 3, which has a hole in it, to rest on with its, for example, self-adhesive side facing upward, the adhesive compound of the self-adhesive side being in this case indicated by a dotted grid 4. A central pin 5 passes through the apertured label 3 and the bearing plate 2, see also FIGS. 2 and 3.

Figure 2:
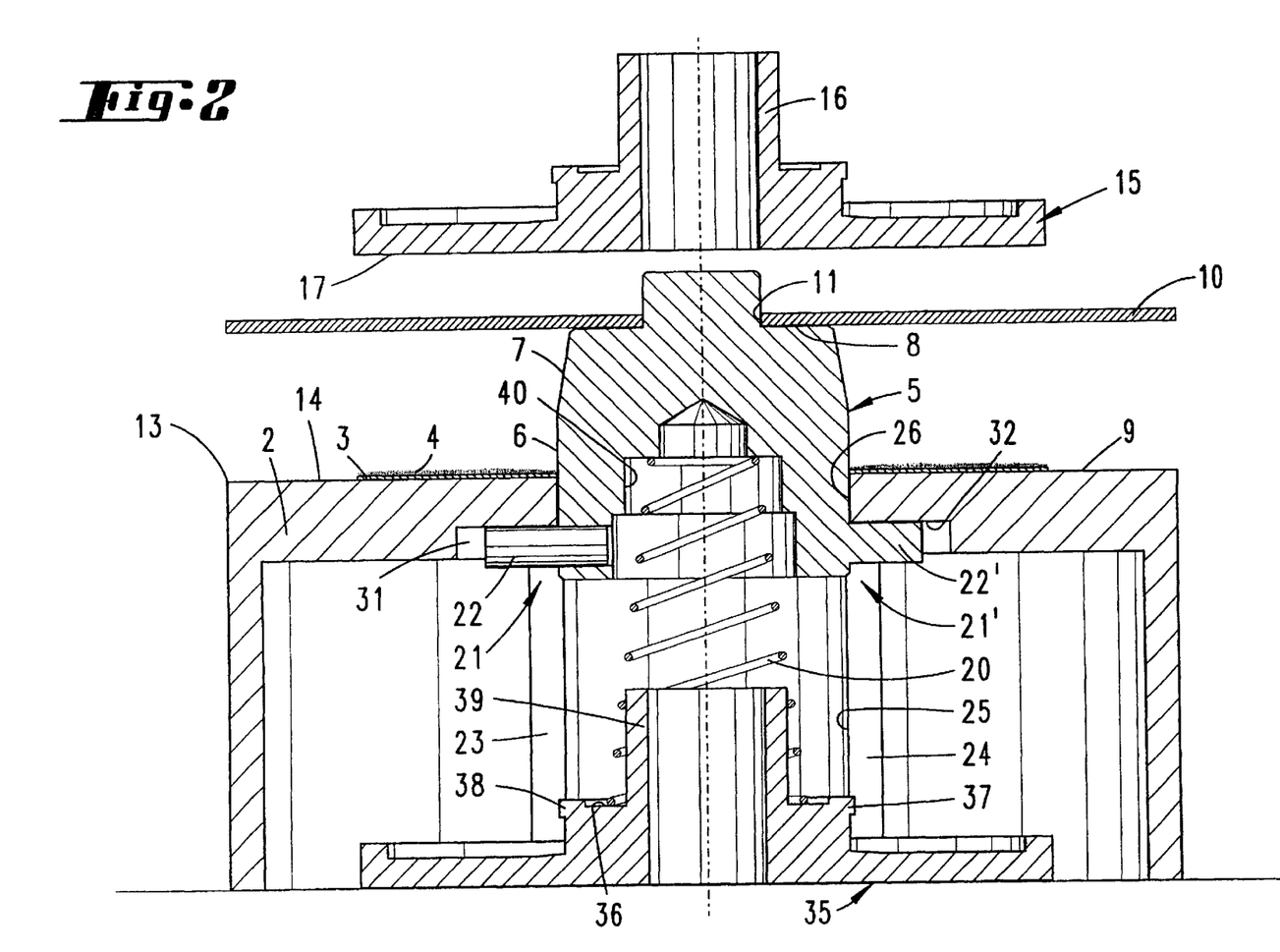
FIG. 2 shows a section through the apparatus according to FIG. 1 with a label placed on the bearing surface, and a CD placed on the pin.
Figure 3:
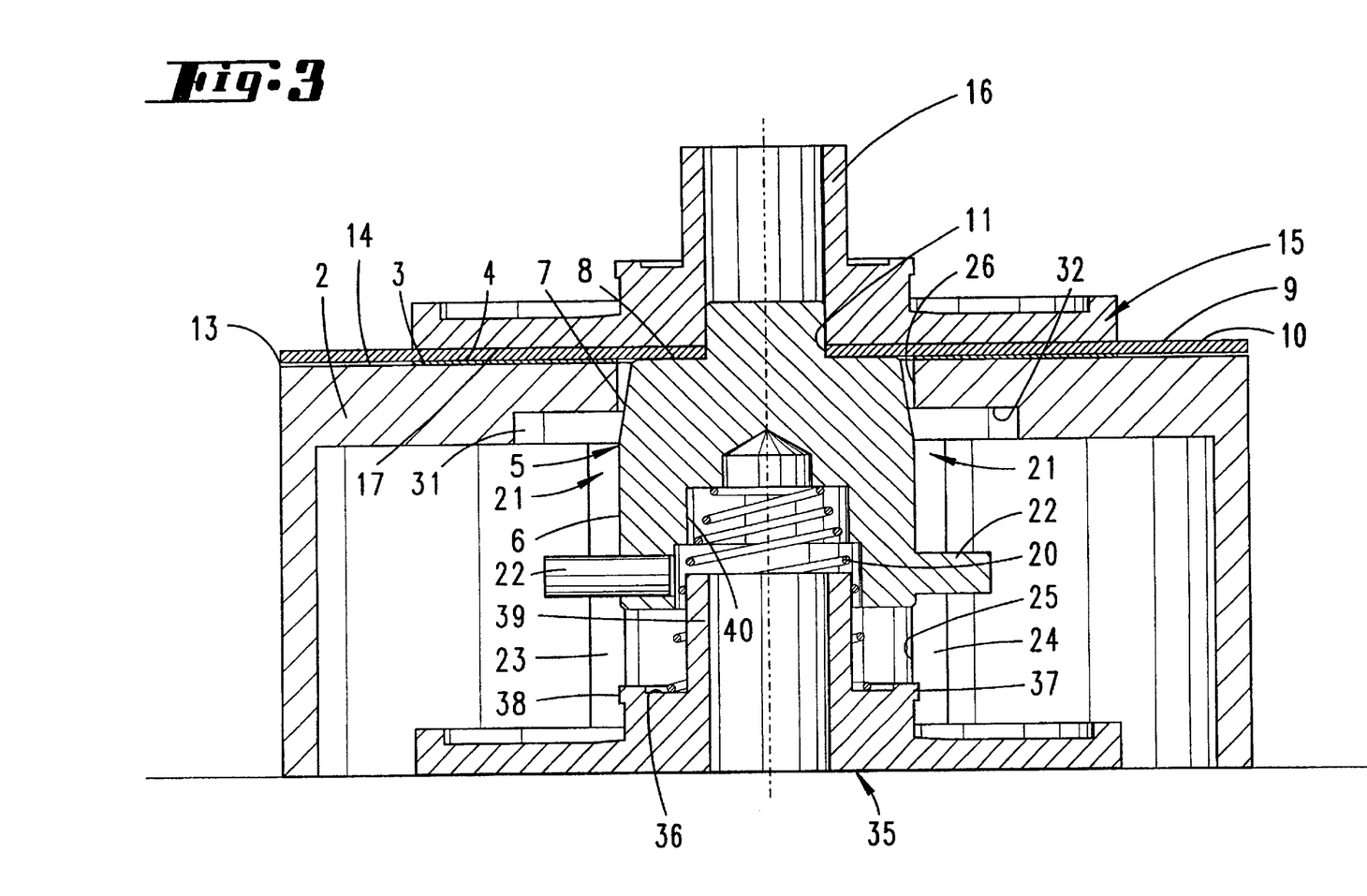
FIG. 3 shows, in the section according to FIG. 2, the moment of adhesion of the label and compact disk.

The pin 5 has a cylindrical section 6 and a conically tapering section 7. As a consequence of this, with a hole of about the same diameter as the pin 5, the label 3 can easily be fitted onto the bearing plate 2. Towards its free end, an annular shoulder 8 is provided by the pin 5 in a plane parallel to the bearing surface 9. A compact disk 10, see FIG. 2, is placed on this annular shoulder 8. A cylindrical shank 12 of the pin 5 passes through the central aperture 11 in the compact disk 10, with an accurate fit. The compact disk 10 thus rests on the pin 5, held such that it is centralised and is exactly parallel to the bearing surface 9.

Lowering of pin 5 is effected by means of a ram 15 which, for this purpose, can be gripped on a central hollow peg 16. The internal diameter of the hollow peg 16 corresponds to the external diameter of the cylindrical shank 12. This dimension results in the compact disk 10 being placed on the shank such that it is held in a secure position, parallel to the bearing surface 9. The parallel position results from the fact that the plane 14 defined by the outer edge 13 on the bearing surface 9 in this case coincides with the bearing surface 9 itself. Furthermore, the matching of the ram surface 17 to the extent of the label 3 also results in a uniform contact pressure between the compact disk 10 and the label 3, see FIG. 3. The lowering of pin 5 is effected against the force of a spring, in this case a compression spring 20 in a guide 21, 21' which is fixed to the base.

The guides 21, 21' are functionally identical, and differ only in the arrangement of the fixed guide projections 22, 22'. If, for example, the guide projection 21 which is fixed to the pin is an inserted stud, for example a steel stud, the guide projection 22' is formed integrally with the pin 5.

Figure 4:
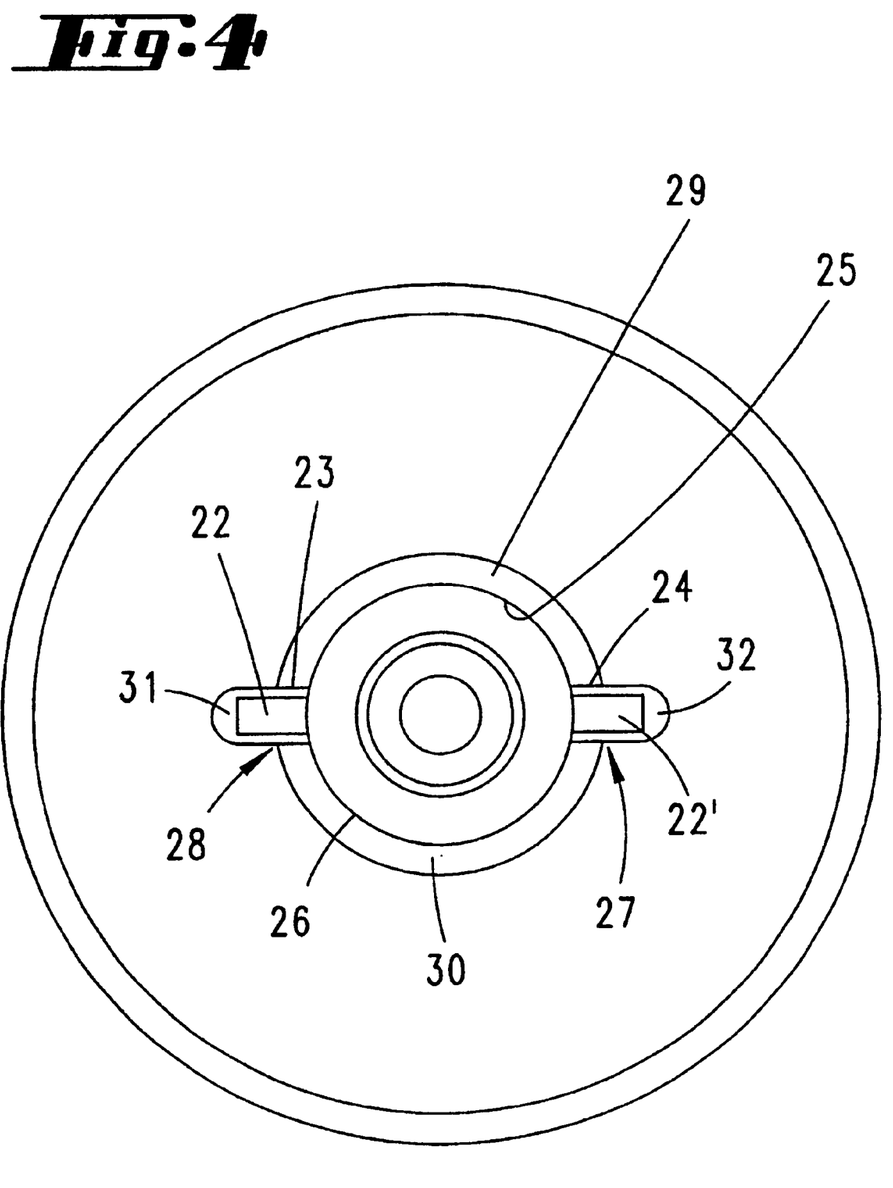
FIG. 4 shows a view from underneath of the base of the apparatus according to FIG. 1, without plate and compression spring.

A common feature of the guide projections 22, 22' is that they are guided in grooves 23, 24 which are incorporated in a casing wall 25 so that they extend in the lowering direction. The casing wall 25 is formed to be concentric with the pin 5, in this case in a circular shape, which results in shape advantages if the central aperture 11 in the compact disk 10 is round, but does not represent an essential arrangement. The internal width of the casing wall corresponds to the diameter of the central hole 25 in the bearing plate 2. This internal diameter likewise corresponds to the external diameter of the cylindrical section 6 of the pin 5. The pin 5 is thus likewise held by the casing wall 25 such that it is guided. In the view from underneath according to FIG. 4, it is shown that the central hole 26 is defined by circular segments between walls 29, 30 which leave between them, slots 27, 28 in the lowering direction for the guide projections 22 and 22', respectively.

Such a subdivision with the guides at 180 degrees to one another, that is to say oppositely disposed guides, is purely by way of example. A subdivision of 90 or 120 degrees is likewise easily to be envisaged.

In the case of guidance of the pin 5 by the wall 29, 30 or casing wall 25, it can furthermore be envisaged that the guides 21, 21' may be dispensed with entirely, or that merely a stop may be provided. When the pin 5 is in the position shown in FIG. 2, the stop is provided on the underside of the bearing plate 2. In the exemplary embodiment, recesses 31, 32 are provided for the guide projections 22, 22'. The depth of the recess 31, 32 substantially provides merely dimensional matching: On the one hand, the pin 5 is intended to project beyond the bearing plate 9 to an adequate extent. On the other hand, with reference to its cylindrical and conically tapering section 6, 7, it should be possible to lower the pin below the bearing surface 9, inside the base 1. For convenience and stability reasons, this base should not be formed to be too high.

For the lowering of the pin 5, a stop to limit the movement is not absolutely essential, since the lowering is limited by the ram 15 engaging against the surface 9, with compact disk 10 and label 3 located in between. On the other hand, slots 27, 28 and grooves 23, 24 must be closed at the free end, in order for the pin to be connected to the base 1 in a captive manner. In the exemplary embodiment, a plate 35 fulfills this purpose, which plate in this case is physically identical to the ram 15. The plate 35 provides an annular shoulder 36, having a circumferential bead 37 on the corner side. The radially projecting portion of this bead 37 latches in an annular groove 38 in the casing wall 25 and in the walls 29, 30. The portion of the bead 37 which projects in the axial direction of the annular shoulder 36 provides a radial limit for the spreading of the compression spring 20, which finds support on the base side on the annular shoulder 36. The hollow peg 39 of the plate 35 also engages in the spring 20. At the other end, the spring (which tapers conically in axial extent) is held in an axial recess 40 in the pin 5. There is no need for any further measures to guide the spring 20 in this case.

Figure 5:
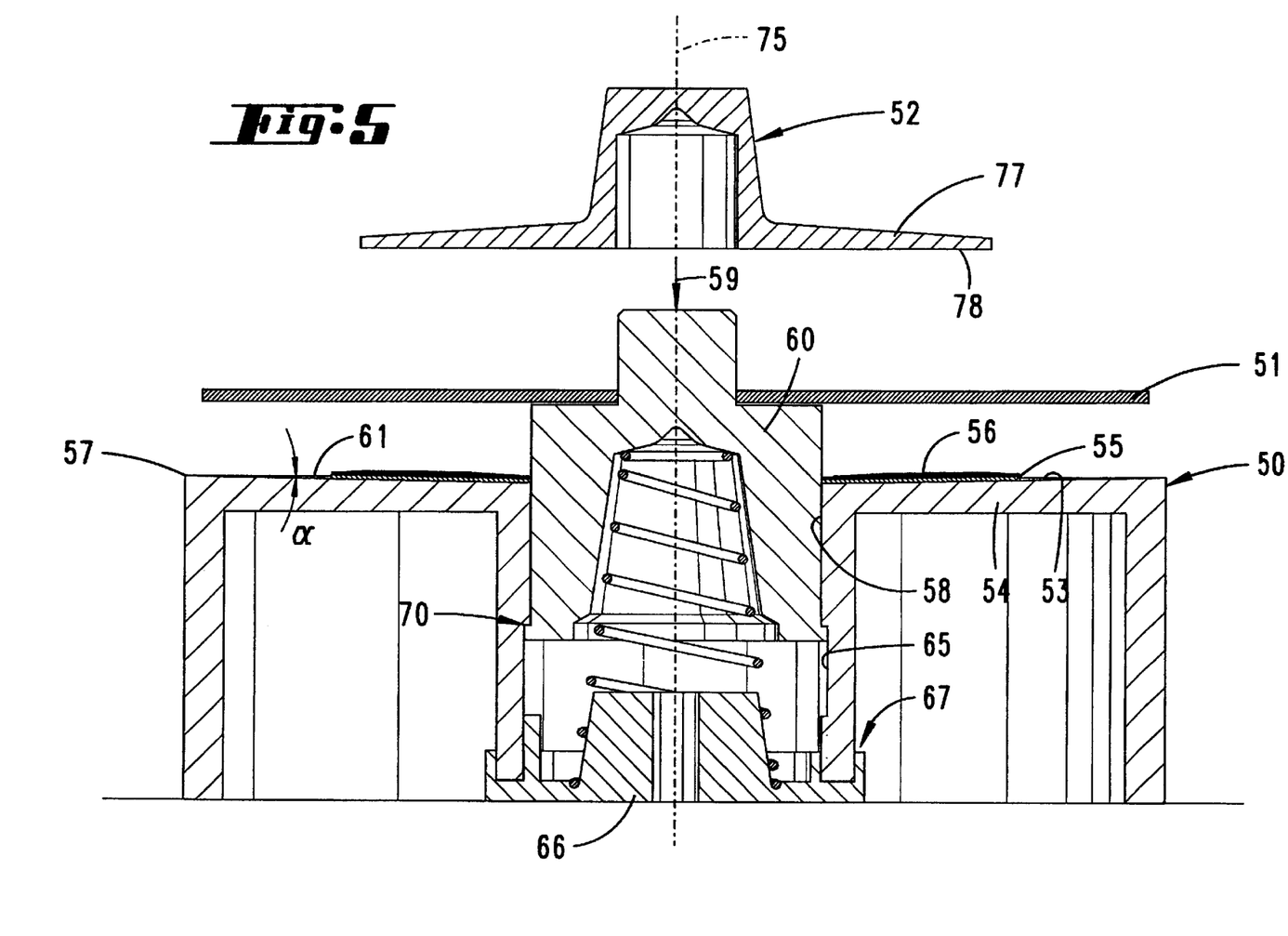
FIG. 5 shows a section through a second exemplary embodiment.
Figure 6:
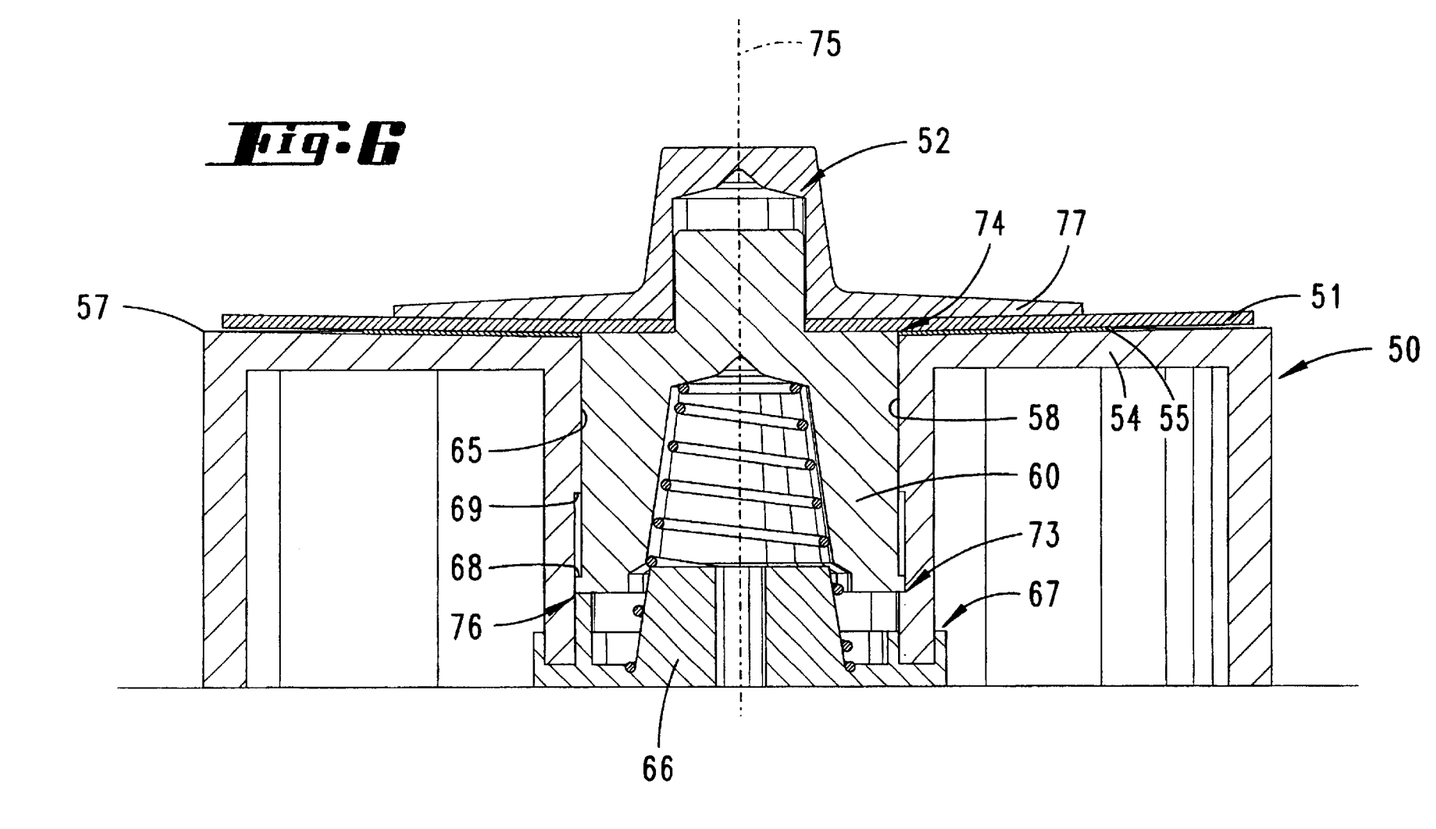
FIG. 6 shows the moment of labeling.

FIGS. 5 and 6 show a second exemplary embodiment of a labeling apparatus according to the invention, with a base 50, compact disk 51 and ram 52. A label 55 is placed on the bearing surface 53 of the bearing plate 54, with the adhesive surface 56 pointing upwards. The bearing surface 53 falls from its outer edge 57 towards the central hole 58, in the lowering direction of the pin 60, as shown by arrow 59, and is shown in the form of a trough or basin. This results in very good contact or support being provided for the label 55 even if it is slightly corrugated, if produced, for example, from plastics. The angle alpha of the deviation of the bearing surface from the plane 61 defined by the outer edge 57 is small and is, for example, only 0.5 degrees. Such a small angle or deviation, which is formed conic ally in the exemplary embodiment, is easily compensated for by the elasticity of the compact disk 51, so that good contact is still ensured.

Paraboloidal, ellipsoidal or other three-dimensionally curved recesses are likewise possible, but are normally more complex to manufacture.

The pin 60 is lowered by means of the ram 52 at right angles to the plane 61 defined by the outer edge 57 of the bearing surface 53, into the position shown in FIG. 6.

During the lowering process, the pin 60 is guided by a casing wall 65 which is fixed to the base and whose free end is seated on a plate 66 in a clamping seat 67. Plate 66 and casing wall 65 are thus releasably connected to one another. The pin 60 and the casing wall 65 are formed in a stepped arrangement. This results in corresponding increases in the cross section of the pin 60 underneath the bearing plate 54, and in the cross-sectional area bounded by the casing wall 65. By annular shoulders 68, 69 formed in this way, a stop 70 according to FIG. 5 is thus provided, which limits the projection of the pin 60, which tapers in a stepped manner above the bearing surface 53.

In corresponding manner, a stop 73 can also limit the lowering of the pin 60. By such a limit, reliable centralising of the label 55 may be achieved, even at the moment of the labeling, by virtue of the pin 60 projecting beyond the bearing surface 53, see arrow 74. For this purpose, in contrast to the previous exemplary embodiment, the pin 60 is formed only to be stepped, and is not conical.

The illustrated stop 73 in conjunction with the stop 70 may enable it to be achieved that the base 50 is composed of a comparatively elastic material, and the pin 60 may then be insertable to expand the casing wall 65. The connection is secured by the clamping seat 67 of the plate 66.

An alternative stop 76 is also illustrated on the left of the axis of symmetry 75 in FIG. 6. Here, an annular shoulder which corresponds to the underside of the pin 60 is formed by the plate 66.

The ram 52 has a ram collar 77 with a ram surface 78. This ram collar 77 is formed to be resilient in this exemplary embodiment in order that, despite the trough-like drawing-in of the bearing surface 53, a secure contact of the likewise resilient compact disk 51 a secure labeling is also provided by good contact of the label 55 and the compact disk 51 on the bearing surface 53.

Figure 7:
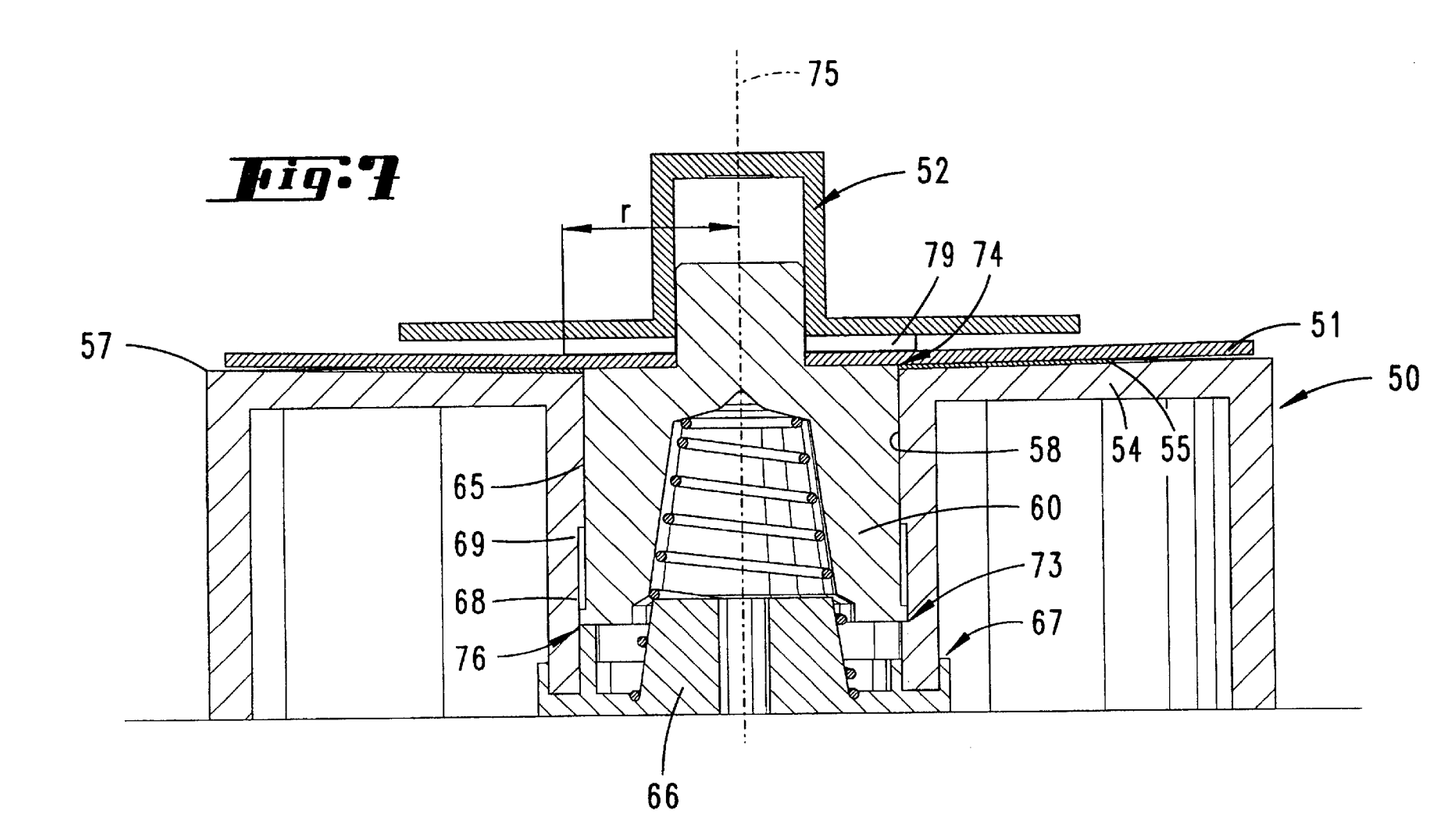
FIG. 7 shows a section through a further embodiment, in which a projection in the form of a circular ring (annulus) is provided on the underside of the ram.

The embodiment according to FIG. 7 corresponds to the embodiment according to FIG. 5 and FIG. 6. In addition, however, an annular projection 79 is in this case provided on the ram 52, on the underside of the ram surface 78. It can be seen that the annular projection 79 is provided at a radius r from the axis of symmetry 75, which corresponds approximately to the diameter of the cylindrical shank 12. On the other hand, with respect to the arrangement of the projection 79, orientation is also carried out on the centrally inner region of the CD, which has not been written to. It is thus also ensured that the region of the CD which has been written to is not impacted upon by the ram 52.

Figure 8:
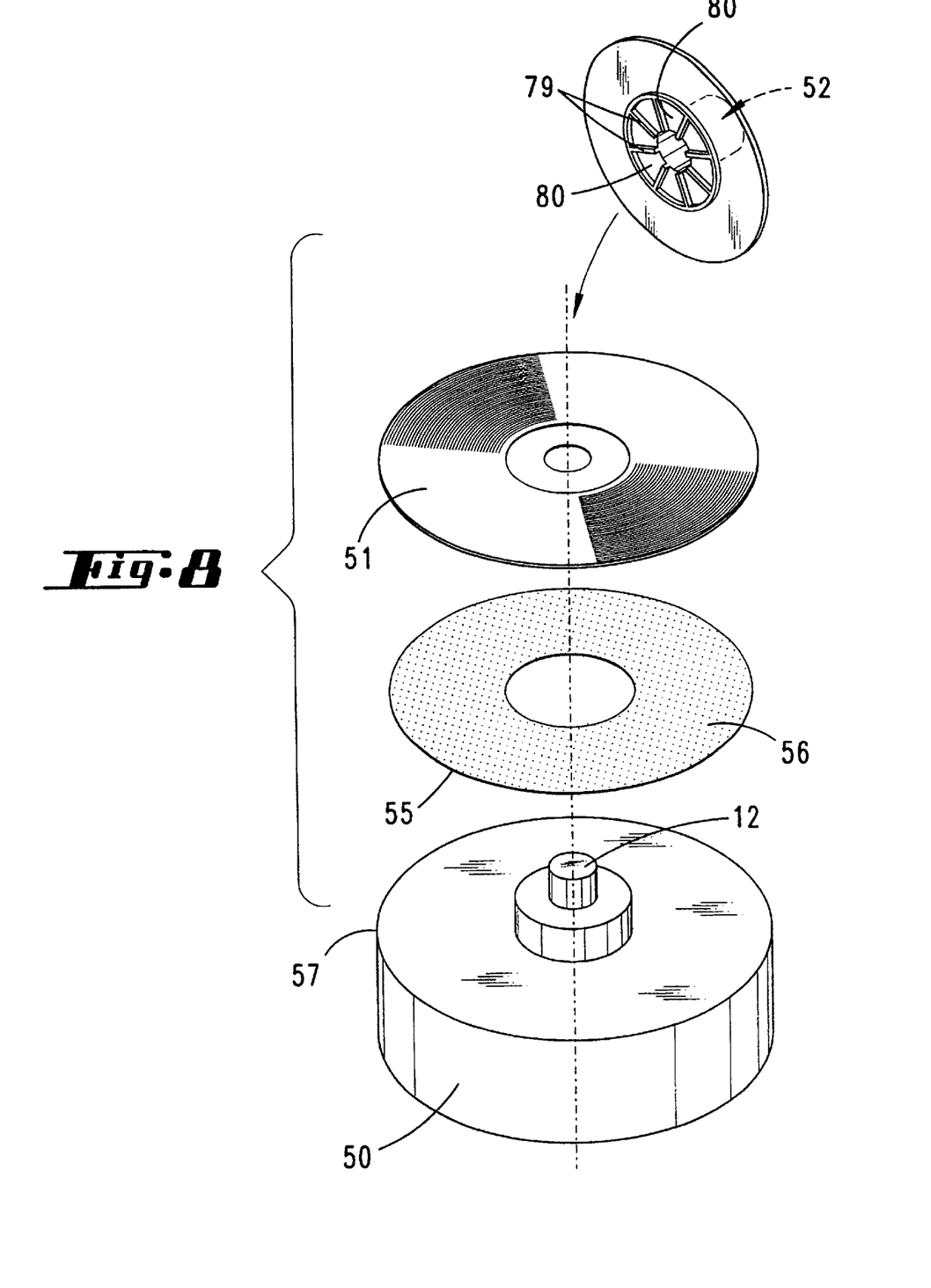
FIG. 8 shows an exploded view of the device with a cover according to FIG. 7.

As can be seen from the further detail in the exploded illustration in FIG. 8, star-form ribs 80 which are oriented on a radius are also provided, starting from the hole in the hollow peg 16. The ribs 80 have a slight upstand dimension with respect to the ram surface 78, to the same extent as the annular projection 79. The annular projection 79 and/or the ribs which are aligned in the form of a star—of the total number of which that are provided eight can be seen—also act in combination during actuation, together with the lowering of the bearing surface 53.

All disclosed features are relevant to the invention. In the disclosure of the application there is hereby also included as to its full extent the disclosure content of the associated/attached priority documents (copy of the initial application), in addition for the purpose of including features of these documents in claims of the present application.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed is:

1. An apparatus for applying a label with a centralized hole to a compact disk with a centralized hole, the apparatus comprising:

a base comprising a bearing plate for accommodating the label, the bearing plate comprising a central hole disposed therein, the base further comprising a pin which comprises a free end and a lower end, the lower end being connected to the base below the bearing plate, the free end being biased upward through the central hole and can be lowered in a guide extending at right angles to the plane defined by the outer edge of the bearing plate, the free end of the pin comprising an annular shoulder for accommodating the compact disk and a shank for mateably engaging the centralized hole of the compact disk, a ram for pressing the free end of the pin and compact disk downward towards the label and the bearing plate, the ram comprising an aperture for mateably receiving the shank.

2. The apparatus of claim 1 wherein the bearing plate is annularly shaped and comprises an outer edge and an inner edge that defines the central hole, the bearing plate also comprising a bearing surface disposed between the outer and inner edges and that engages the label, the inner edge of the bearing surface being vertically offset from the outer edge and the bearing surface being curved as it extends from the outer edge to the inner edge.

3. The apparatus of claim 1 wherein the pin is tapered as it extends from the lower end to the free end.

4. The apparatus of claim 1 wherein the pin is conically shaped.

5. The apparatus of claim 1 wherein the pin is tapered in a stepped manner as it extends from the lower end to the free end.

6. The apparatus of claim 1 wherein the base further comprises a casing wall which is concentric with and mateably receives the pin.

7. The apparatus of claim 6 wherein the casing wall comprises at least one longitudinal groove in the lowering direction and the pin comprises at least one projection that is guidingly held in the longitudinal groove.

8. The apparatus of claim 6 wherein the pin comprises a projecting portion that extends radially outwardly and the casing wall comprises a recess for accommodating the projecting portion.

9. The apparatus of claim 6 wherein the casing wall extends between the bearing plate and a bottom plate.

10. The apparatus of claim 9 wherein the bottom plate is releasably connected to the casing wall.

11. The apparatus of claim 9 further comprising a spring disposed between the bottom plate and the pin.

12. The apparatus of claim 11 wherein the bottom plate comprises a peg for mateably engaging one end of the spring and the pin comprises an axial recess for receiving an opposing end of the spring.

13. The apparatus of claim 9 wherein the bottom plate and the ram are physically identical.

14. The apparatus of claim 1 wherein the base further comprises two opposing casing walls which extend downwardly from the bearing plate adjacent to and on opposing sides of the central hole, the casing walls forming two opposing slots disposed between the casing walls and which extend downward from the bearing plate, the pin being received between the casing walls, the pin further comprising two opposing projections, each projection being accommodated in one of the opposing slots.

15. The apparatus of claim 14 wherein the casing walls extend between the bearing plate and a bottom plate.

16. The apparatus of claim 15 wherein the bottom plate is releasably connected to the casing walls.

17. The apparatus of claim 15 further comprising a spring disposed between the bottom plate and the pin.

18. The apparatus of claim 17 wherein the bottom plate comprises a peg for mateably engaging one end of the spring and the pin comprises an axial recess for receiving an opposing end of the spring.

19. The apparatus of claim 15 wherein the bottom plate and the ram are physically identical.

20. The apparatus of claim 1 wherein the lower end of the pin comprises a stop which engages the base when the pin is in a maximum lowered position, the free end of the pin still extending above the bearing plate when the stop engages the base and when the pin is in the maximum lowered position.

21. The apparatus of claim 1 wherein the ram comprises an annular collar comprising a resilient material.

22. The apparatus of claim 1 wherein the ram comprises a central annular portion comprising downwardly facing ram surface that engages the compact disk, the ram surface comprising an annular projection.

23. The apparatus of claim 22 wherein the annular projection has a thickness and the central portion has a thickness, the thickness of the central portion being about equal to the thickness of the annular projection.

24. The apparatus of claim 23 wherein the thicknesses of the annular projection is about equal to two times a thickness of the compact disk.

25. The apparatus of claim 22 wherein the annular projection is in matching registry with an inner region of the compact disk which is not written to.

26. The apparatus of claim 1 wherein the ram comprises a central annular portion comprising downwardly facing ram surface that engages the compact disk, the ram surface comprising a plurality of radially outwardly extending ribs.

27. The apparatus of claim 26 wherein the ribs have a thickness about and the central portion has a thickness, the thickness of the central portion being about equal to the thickness of the ribs.

28. The apparatus of claim 26 wherein the thicknesses of the ribs and the central portion are about equal to twice a thickness of the compact disk.

29. The apparatus of claim 28 wherein the compact disk comprises an inner region which is not written to and the annular projection of the ram is associated with said inner region of the compact disk.

30. The apparatus of claim 1 wherein the base is unitary in construction and comprises a tube which is closed at the end by the bearing surface.

31. The apparatus of claim 1 wherein the pin and the cross-sectional area bounded by the casing wall have corresponding increases and/or reductions in cross section underneath the bearing plate.

32. An apparatus for applying a label with a centralized hole to a compact disk with a centralized hole, the apparatus comprising:

a base comprising a bearing plate for accommodating the label, the bearing plate comprising a central hole disposed therein, the base further comprising a pin comprising a free end and a lower end, the lower end being connected to the base below the bearing plate, the free end being biased upward through the central hole and perpendicularly past the bearing plate, a ram for pressing the free end of the pin and compact disk downward towards the label and the bearing plate, the ram comprising an underside which comprises an annular projection.

33. An apparatus for applying a label with a centralized hole to a compact disk with a centralized hole, the apparatus comprising:

a base comprising a bearing plate for accommodating the label, the bearing plate comprising a central hole disposed therein, the base further comprising a pin comprising a free end and a lower end, the lower end being connected to the base below the bearing plate, the free end being biased upward through the central hole and the bearing plate, the base further comprises two opposing casing walls which extend downwardly from the bearing plate adjacent to and on opposing sides of the central hole, the casing walls forming two opposing slots disposed between the casing walls and which extend downward from the bearing plate, the pin being received between the casing walls, the pin further comprising two opposing projections, each projection being accommodated in one of the opposing slots formed by the casing walls, a ram for pressing the free end of the pin and compact disk downward towards the label and the bearing plate.

34. An apparatus for applying a label with a centralized hole to a compact disk with a centralized hole, the apparatus comprising:

a base comprising a bearing plate for accommodating the label, the bearing plate comprising a central hole and an outer edge, the base further comprising a pin comprising a free end and a lower end, the lower end being connected to the base below the bearing plate, the free end being biased upward through the central hole and can be lowered in a guide at right angles to the plane defined by the outer edge of the bearing plate, the base further comprising a casing wall which is concentric with and mateably receives the pin, the casing wall comprising at least one longitudinal groove in the lowering direction and the pin comprising at least one projection that is guidingly held in the longitudinal groove.

* * * * *